United States Patent [19]

Steinberg

[11] 4,284,071
[45] Aug. 18, 1981

[54] SOLAR OVEN

[76] Inventor: Hy Steinberg, 7200 NW. 78th St., Tamarac, Fla. 33319

[21] Appl. No.: 47,137

[22] Filed: Jun. 11, 1979

[51] Int. Cl.³ .......................... F24J 3/02; F28F 13/00
[52] U.S. Cl. ..................................... 126/451; 165/136
[58] Field of Search ................ 126/451, 438; 165/133, 165/135, 136

[56] References Cited

U.S. PATENT DOCUMENTS

| 681,095 | 8/1901 | Baker | 126/451 |
|---|---|---|---|
| 1,424,932 | 8/1922 | Moreau | 126/451 |
| 2,110,660 | 3/1938 | Doczekal | 165/136 |
| 2,637,530 | 5/1953 | Janos | 165/136 |
| 3,025,851 | 3/1962 | Steinberg | 126/451 |
| 3,106,201 | 10/1963 | Steinberg | 126/451 |
| 3,156,234 | 11/1964 | Steinberg | 126/451 |
| 3,174,476 | 3/1965 | Steinberg | 126/451 |
| 3,231,339 | 1/1966 | Murthy et al. | 165/136 |
| 3,236,300 | 2/1966 | Chave et al. | 165/136 |
| 4,119,085 | 10/1978 | Knowles et al. | 126/443 |

*Primary Examiner*—Daniel J. O'Connor
*Attorney, Agent, or Firm*—Malin & Haly

[57] ABSTRACT

An efficient heat insulating food heating chamber for a solar oven. The heating chamber includes a compartment and reflecting devices for concentrating solar radiation to elevate the temperature of the heating compartment. The heating compartment is defined by a lateral outer casing, an intermediate insulation and shock absorbing medium, and an innermost evacuated or partially evacuated glass casing. The inner most casing has a substantially angular inner wall for additional reflection of solar energy and a stepped surface for supporting transparent plates and a collection plate.

5 Claims, 5 Drawing Figures

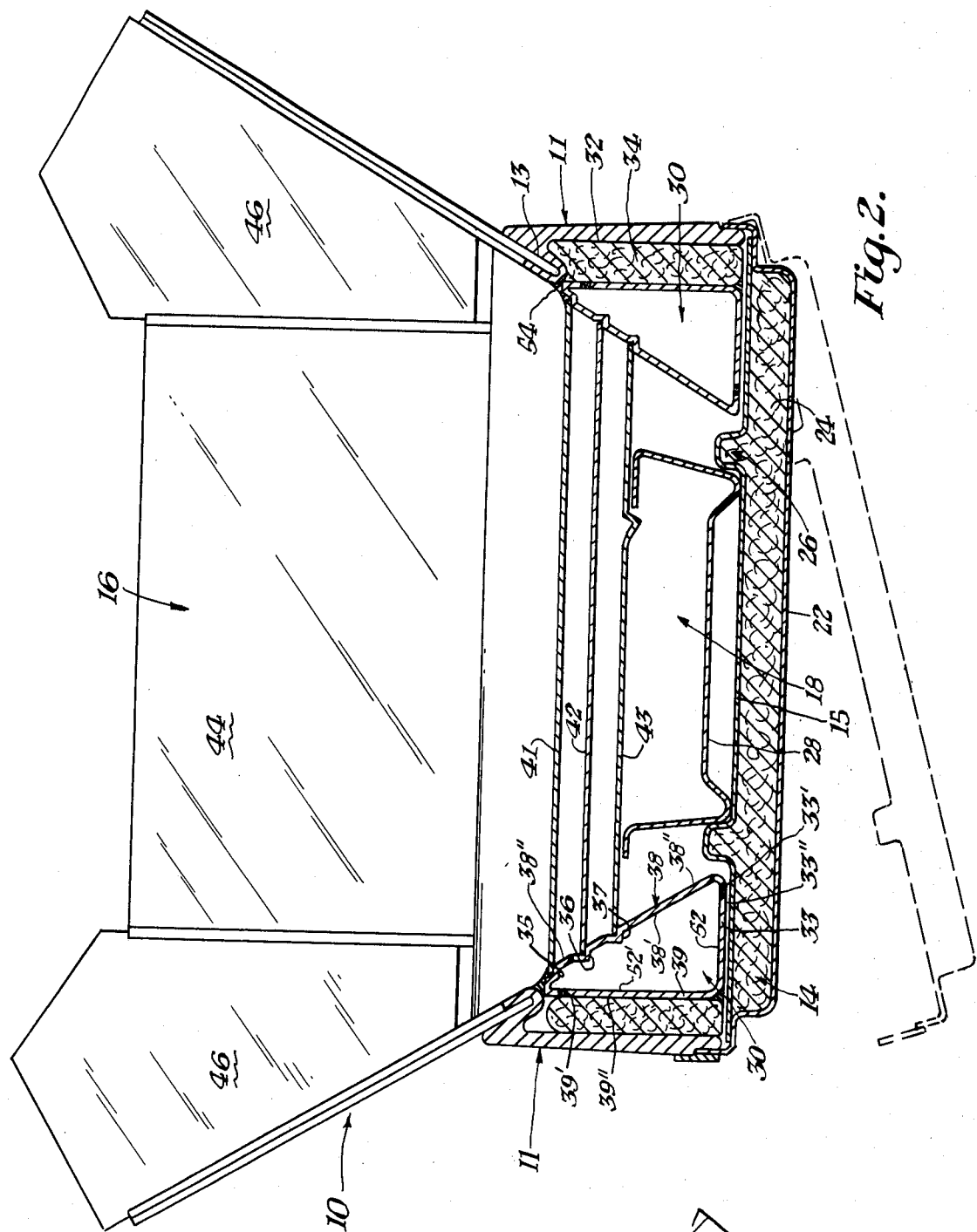
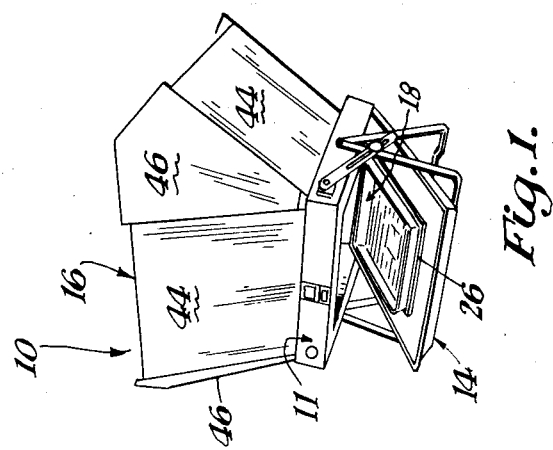

SOLAR OVEN

BACKGROUND OF THE INVENTION

This invention relates generally to improvements in solar ovens, and more particularly to an improved insulating food heating chamber. In the past, the heating chamber walls, which support the heat conductive metal collector plate and the transparent plates above the collector plate, were made of plastic insulating materials. However, when the solar oven was in operation, the high temperature of the collector plate was conducted through the supporting portion of the heating chamber, thereby creating undesirable effects on the insulating materials such as the release of obnoxious odors as well as volatile substances which condensed on and stained the surfaces of the transparent plates located in front of the collector plate.

Furthermore, insulation materials used in prior solar ovens have not been efficient enough to enable heating chamber temperatures to reach cooking temperatures when the sun was partially obscured and the incident solar energy was reduced to less than that which is normally received on a clear, bright day.

SUMMARY OF THE INVENTION

The present invention relates to a new and improved solar oven whereby the efficiency is greatly increased and the other deleterious effects mentioned above are eliminated.

In accordance with the present invention, a solar oven is provided with a heating compartment and a means for concentrating solar radiation to elevate the temperature of the heating compartment. The heating compartment is defined by a lateral outer casing, an intermediate insulation and shock absorbing medium, and an innermost evacuated glass casing. The outer casing, the intermediate medium, and the inner casing being generally concentric. The inner casing has a substantially angular inner wall with a stepped surface for supporting transparent plates and a metallic collection plate.

The heating compartment also includes a moveable lower insulated cover which allows insertion of food to be cooked in the heating chamber.

Accordingly, it is an object of the present invention to provide a solar oven that eliminates the emanation of volatile substances and odors from the heated surfaces in contact with or in close proximity to the collector plate.

It is another object of the present invention to provide a solar oven that may be efficiently used on marginally sunny days.

It is a further object of the present invention to provide a solar oven that can be readied for use with a shorter warm-up time.

In accordance with these and other objects which will be apparent hereinafter, the instant invention will now be described with particular reference to the accompanying drawings.

BRIEF DESCRIPTION OF THE DRAWINGS

FIG. 1 is a perspective view of a solar oven embodying the present invention with the door open.

FIG. 2 is a sectional elevational view of a solar oven generally along the center line of FIG. 1.

DESCRIPTION OF A PREFERRED EMBODIMENT

Figure 3:
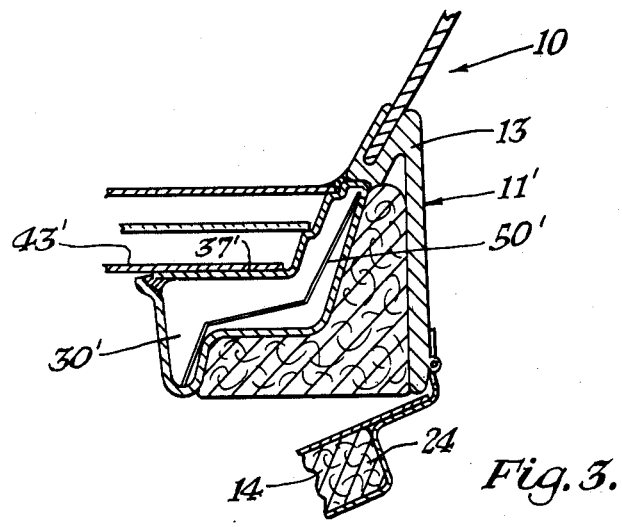
FIG. 3 is a side elevational view partially broken away showing another embodiment of the present invention.

Referring now in detail to the drawings, wherein one embodiment of the present invention is shown, and referring particularly to FIG. 1, a solar oven, generally designated as numeral 10 is illustrated having a box-like body 11 with a hinged cover or door 14 at one end and reflectors 16 held in channel 13 at the opposite end for concentrating solar radiation to elevate the temperature of a heating compartment generally designated by numeral 18 accessible by way of the door 14.

The outer box-like body 11 and the outer surface 22 of the door 14 hinged thereto, as illustrated in FIG. 2, are molded of a suitable rigid plastic material, such as polypropylene. The inside surface 15 of the door 14, which is generally square in configuration, is in intimate contact with a layer of insulation material 24, and is provided with ridge-type portion, generally designated by numeral 26, which positions a food pan 28 or food heating container, which may be made of a suitable material such as aluminum foil therein.

The inside surface 32 of the outer body 11 is in intimate contact with a layer of insulation material 34. As illustrated in FIG. 2, the insulation material 34 also acts as a cushion and support for the evacuated or partially evacuated glass inner cell 30. The glass inner cell is preferably comprised of an upper, angled portion, generally designated by numeral 38, and a combined base portion 33 and vertical portion 39, which are cemented together at their mating edges 39' and 33' to form an air-tight cell with generally triangular cross-section. The cell has step-like portions 35, 36, and 37 on the upper angled portion 38. The cement combining the upper surface 38 and the base-altitude surfaces 33 and 39 acts as a vacuum seal and also as a thermal break. The step portions 35 and 36 support flat transparent glass or plastic plates 41 and 42 respectively, which permit solar energy to pass therethrough but block reradiation of infrared energy from the collector plate 43 which is supported on step 37.

The reflectors 16, generally comprise four rectangular reflector panels or mirrors 44 and four trapezoidal corner reflector panels or mirrors 46. The rectangular panels 44 are moveably connected to the upper ledge or channel 13 of the outer container 11, so that in an operative position, that is, when the panels 44 are open, the plane of each panel 44 is at an inner angle of 120 degrees with respect to the collector plate 43. Each panel 44 removeably supports the generally trapezoidal corner panels 46.

The inside surface 38' and 52 and 52' of the evacuated glass inner cell 30 are made light and heat reflective by silvering the surfaces 38, 52, and 52' for example, or by spray metalizing the surfaces or by vacuum evaporation of aluminum or other suitable metal.

The glass inner cell 30 may be completely or partially evacuated or evacuated and partially filled with freon or carbon dioxide or other gas which is less heat conductive than air.

The evacuated inner glass cell 30 has its outer surfaces 33", 38", and 39" cemented to the body 11 by insulating material, such as silicon rubber. Therefore, the collector plate 43, the lower portion of the outer surface 38" below the collector plate 43, and the inside surface 15 of the door 14, define the heating compartment 18. Due to the specific angular relationship of the mirrors 44 to the collector plate 43, and to the provision of reflecting surfaces 38" on the upper portion of 38, substantially all of the intercepted solar energy is reflected onto the collector plate 43, where it is converted into thermal energy and transferred by conduction, convection and radiation to the food in the food pan 28 within the heating compartment 18.

Figure 4:
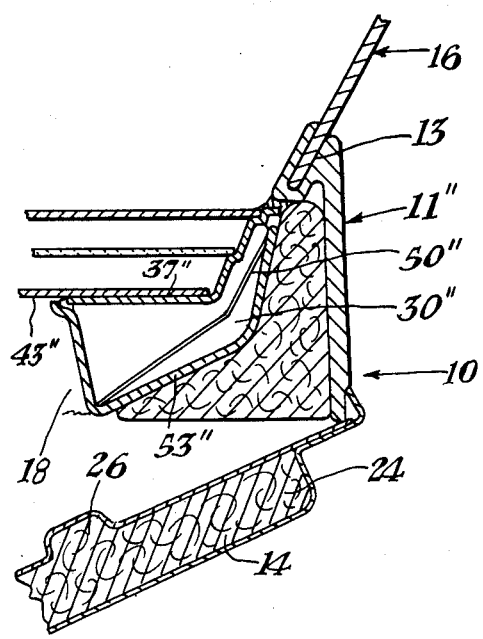
FIG. 4 is a side elevational view partially broken away, showing another embodiment of the present invention.
Figure 5:
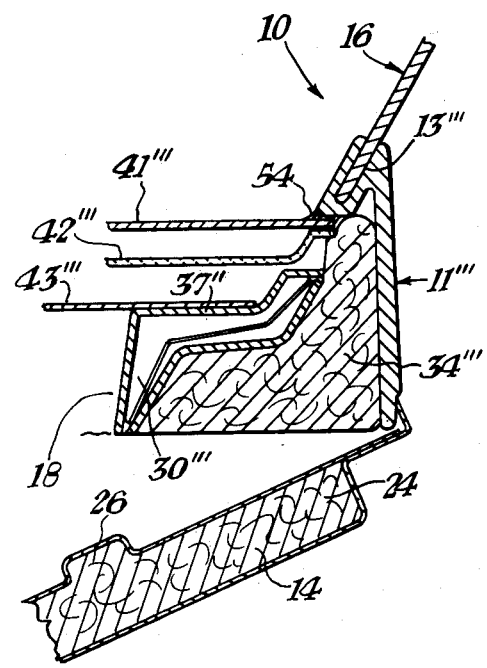
FIG. 5 is a side elevational view, partially broken away, showing another embodiment of the present invention.

FIGS. 3 and 4 illustrate other embodiments of the present invention in which the evacuated glass inner cell 30' and 30" have an inwardly extending shelf 37' and 37" respectively which the collector plate 43' and 43" is supported on, all of which are connected to outer container 11' and 11" respectively. The evacuated glass inner cell 30' and 30" have reflective metal foil radiation barrier 50' and 50" therein, configured in shape generally so as to be suspended between the lower portion 53' and 53" and the upper portion 37' and 37". FIG. 5 illustrates yet another embodiment in which the evacuated glass inner cell 30''' supports only the collector plate 43''', while the flat transparent glass plates 41''' and 42''', which together comprise an evacuated cell, are supported by insulating material 34''' and are cemented to outer container 11''' by sealer 54 such as silicon rubber.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a solar oven including an outer casing with insulated internal walls, an opening in one end thereof and a flat collector plate within the internal walls, and means for concentrating solar energy onto said collector plate to elevate the temperature of said collector plate and the compartment within said insulated internal walls to cook food received in said compartment, the improvement comprising:

a substantially evacuated inner casing means for insulating said compartment from said outer casing, said inner casing means including a first wall portion having a first end and a second end, said first wall portion contacting said insulated internal walls, and said outer casing means including a second wall portion connecting said first end and second end of said first wall portion to provide an evacuated chamber, whereby said inner casing means supports said collector plate on said second wall portion, said second wall portion is thermally isolated from said first end and said second end of said first wall portion by a thermal break material.

2. A solar oven as set forth in claim 1, wherein:
the surfaces of said inner casing means are made reflective by means of a metallic coating.

3. A solar oven as set forth in claim 1, wherein:
said thermal break material is a silicone rubber insulating adhesive sealer, and
said inner casing means is composed of at least a portion of glass.

4. A solar oven as set forth in claim 1, wherein:
a reflective metal foil heat-radiation barrier is disposed within said inner casing means to further reduce heat transfer between said second wall and said first wall.

5. A solar oven as set forth in claim 4, wherein:
said second wall portion is thermally isolated from said first end and said second end of said first wall portion by a thermal break material.

* * * * *